H. S. HUMPHREY.
WATER HEATER.
APPLICATION FILED JUNE 24, 1916.

1,308,078.

Patented July 1, 1919.
3 SHEETS—SHEET 1.

WITNESSES

INVENTOR

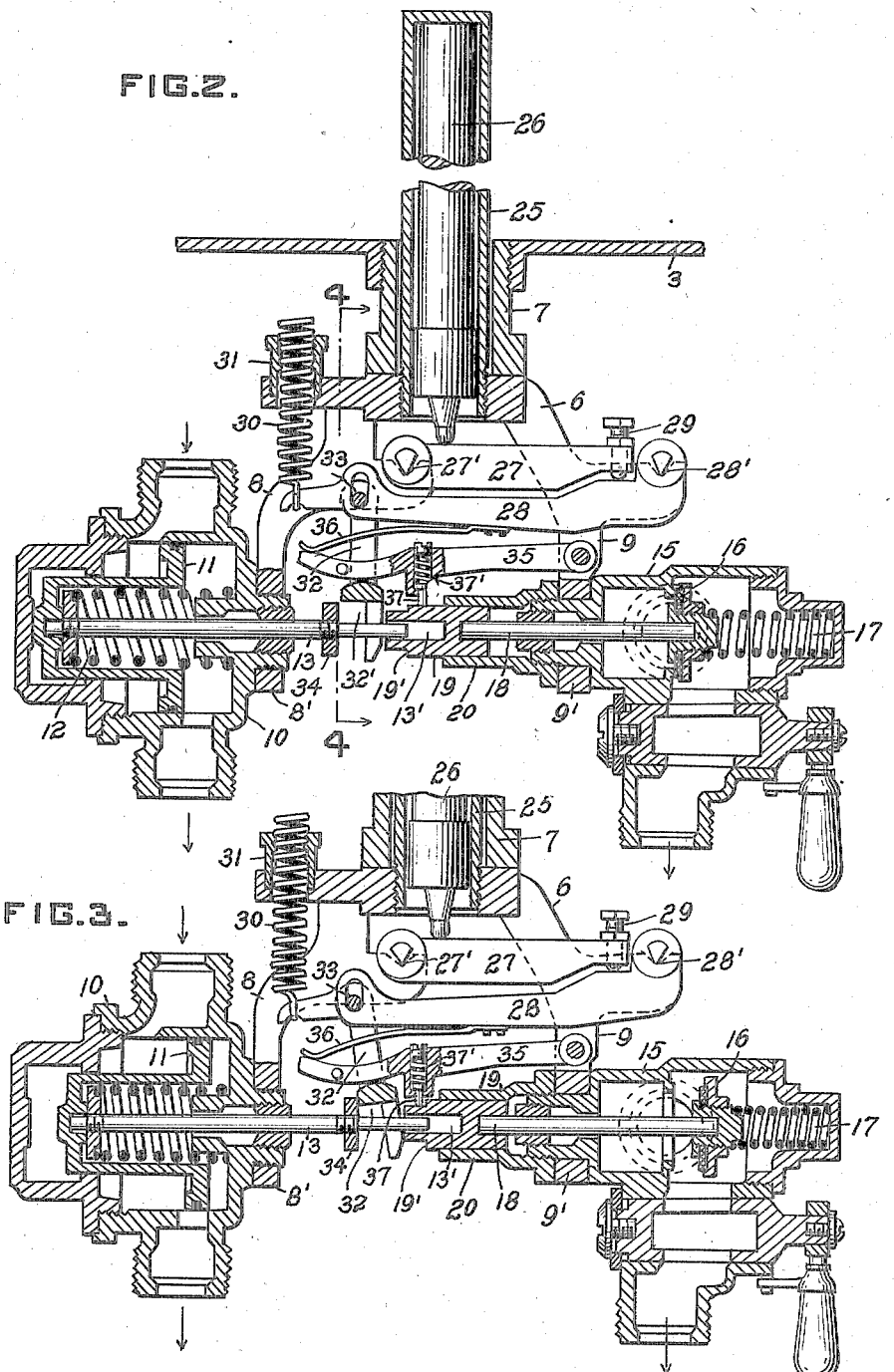

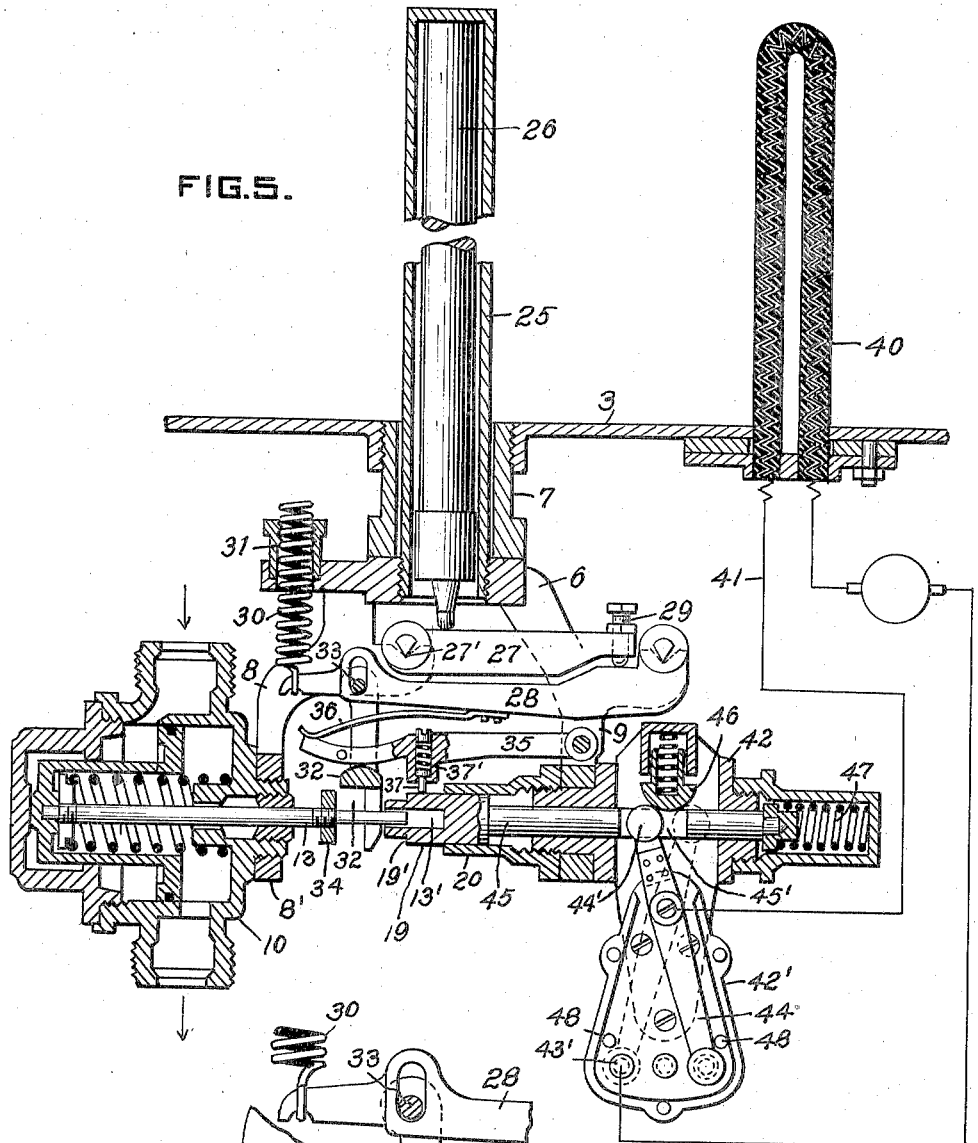

UNITED STATES PATENT OFFICE.

HERBERT S. HUMPHREY, OF KALAMAZOO, MICHIGAN.

WATER-HEATER.

1,308,078.

Specification of Letters Patent.

Patented July 1, 1919.

Application filed June 24, 1916. Serial No. 105,656.

*To all whom it may concern:*

Be it known that I, HERBERT S. HUMPHREY, a citizen of the United States, and resident of Kalamazoo, in the county of Kalamazoo and State of Michigan, have invented certain new and useful Improvements in Water-Heaters, of which the following is a specification.

The primary object of this invention is to provide apparatus of improved construction wherein the withdrawal of heated water operates to start a flow of heat producing medium such as gas or electric current, with the continuation of such flow automatically controlled by the temperature of the water, the flow continuing until the water has reached a predetermined temperature when it is automatically shut off, this being accomplished even though in the mean time the motor device has been restored to normal position, as it is automatically upon stopping the flow of water.

It is characteristic of the invention that the flow of the heating medium is started only upon the opening of a hot water outlet, but as already stated after having been once started the flow continues until the water in the storage tank or other container has reached a predetermined temperature. The invention may be variously embodied, both as to the conditions under which the flow of heating medium is started, and the character of such medium. In one adaptation, the flow is started only when the temperature is below a predetermined minimum; when in excess of such minimum the operation of the motor device or water valve having no effect on the mechanism which controls the heating medium. In another adaptation, the heating medium is started to flow whenever hot water is withdrawn and the flow continues so long as the water outlet is open. In these adaptations the controlled heating medium may be either gas or electric current.

Figure 1:
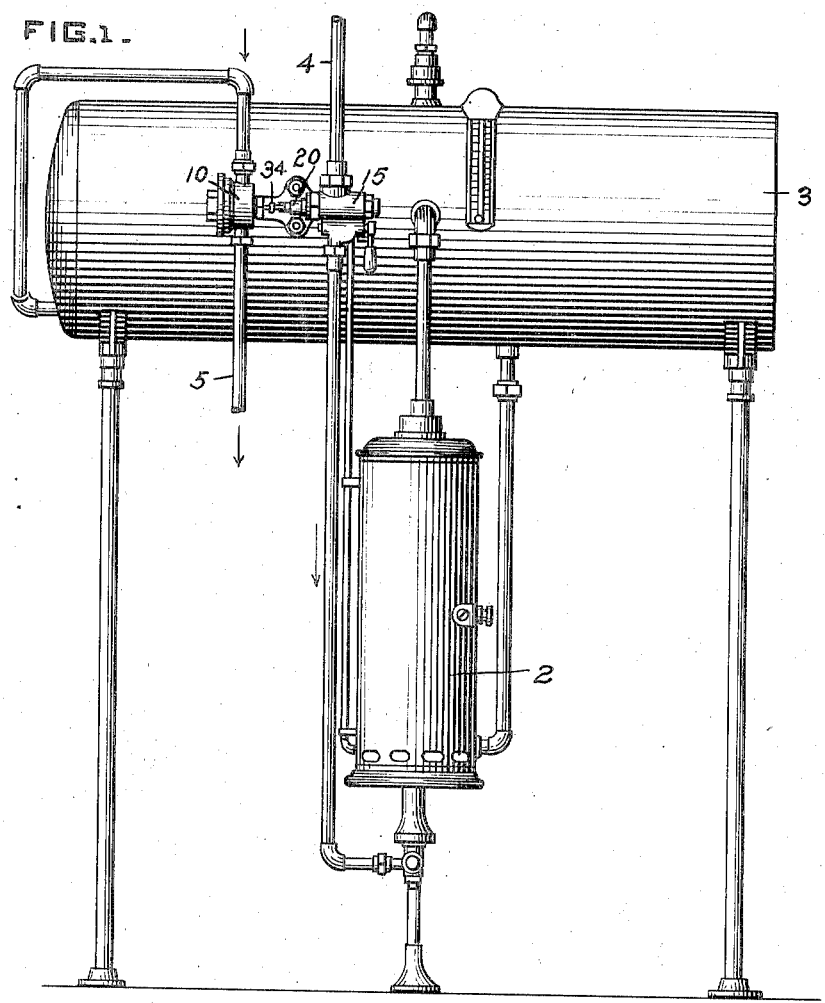
Figure 4:
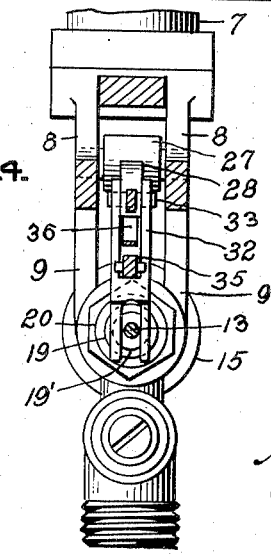

In the accompanying drawings, Figure 1 is an elevation of apparatus embodying the invention, including the water heater, and storage tank, and the automatic mechanism to which the invention is especially directed. Fig. 2 is a sectional view of an adaptation of the automatic mechanism for controlling the flow of gas, the parts being shown in normal position with both the water and gas valves closed, and Fig. 3 is a similar view with the valves held open. In each of Figs. 2 and 3 the apparatus is of such construction that the gas valve is operated only when the water in the storage tank is below a predetermined temperature. Fig. 4 is a cross section on line 4—4 of Fig. 2. Fig. 5 is a sectional view similar to Fig. 2, showing the improved mechanism arranged for controlling the flow of electric current. Fig. 6 is a detail showing a form of mechanism which results in starting a flow of heating medium whenever a hot water outlet is opened regardless of the temperature of the water in storage. In Figs. 2, 3 and 5 the inlet and outlet of the water valve, and in Figs. 2 and 3 the inlet and outlet of the gas valve are shown in different positions than in Fig. 1 to facilitate illustration, but without in any way changing the operation.

Referring to the drawings, 2 designates a gas burning water heater of conventional form and 3 is a storage tank to which the heater is connected by the usual arrangement of circulation pipes. Gas is supplied to the heater through line 4, and water is withdrawn from the tank through line 5. The mechanism interposed between lines 4 and 5 whereby the flow of the heating medium—gas or electric current—is controlled by the flow of water, consists of a yoke-shaped frame 6 which is secured by tubular fitting 7 to tank 3. The opposed arms 8 and 9 of frame 6 are constructed with the terminal socket-like holders 8' and 9' respectively, and secured in socket 8' is casing 10 of a water valve 11 of usual construction. This valve is of conventional form and opens against the action of spring 12 from the position shown in Fig. 2 to that of Fig. 3 whenever the pressure is reduced by opening an outlet connected to the discharge side of the valve casing, the spring returning the valve to normal position as soon as the outlet is closed and the pressure restored. A stem 13 projects from the valve toward yoke arm 9. The water valve comprises a motor for actuating the mechanism which controls the flow of the heating medium.

In the gas control adaptation of Figs. 1, 2 and 3, the gas valve casing 15 is secured in yoke 9' in manner similar to the mounting of the water valve in yoke 8'. The gas valve 16 is held normally closed by spring 17, and stem 18 projects from the valve toward and in line with the water valve stem 13. Secured to the extremity of stem 18 is coupling head 19 having a cavity 13' in which the extremity of stem 13 is movable, head 19 being slidable in guide 20.

The thermostatic mechanism consists of a metal tubing 25 having high coefficients of expansion and contraction, the tube extending into tank 3 with its open outer end secured to frame 6. Within the tube is the neutral rod 26. The mechanism here shown for transmitting motion from the thermostat consists of the reversely disposed movement-multiplying levers 27 and 28. Lever 27, engaged by rod 26, is fulcrumed at 27' to arm 8 of frame 6, and lever 28 is similarly fulcrumed at 28' to arm 9 of the frame, an adjustable bearing screw 29 at the extremity of lever 27 engaging lever 28 near the fulcrum of the latter, as shown. The free extremity of lever 28 is held by coiled spring 30, the latter adjustably secured by hollow nut 31 to frame 6 with the pull of the spring opposing the pressure of neutral rod 26 when thermostatic tube 25 contracts. The convolutions of spring 30 have a screw action in the grooved bore of nut 31 whereby the tension of the spring may be regulated as desired.

The device for operatively connecting the stems of the water and gas valves extends from lever 28, and consists of an arm 32 having a pin and slot connection 33 with the lever whereby the arm has pivotal movement relatively thereto, and whereby under conditions hereinafter referred to the lever may move independently of the arm. The free portion of arm 32 is slotted to embrace stem 13 and one side of the said slotted portion of the arm engages the extremity of coupling head 19. The opposite face of the arm is recessed at 32', and adapted, under certain conditions, to move in this recess is stop 34 secured to stem 13, at which time the stem moves in socket 19' of head 19 without disturbing the gas valve. This occurs when the water in tank 3 is above a predetermined minimum, with tube 25 expanded sufficiently to enable spring 30 to maintain lever 28 in such position that arm 32 is withdrawn sufficiently far not to be engaged by stop 34. When however, the temperature reaches the point at which the apparatus is set to operate, the contraction of the thermostat distends the levers, and recess 32' of arm 32 is moved out of register with stop 34 so that the latter engages the arm as shown in Fig. 3, thereby providing a positive connection between stem 13 and coupling 19, with the result that when the water valve is opened by the withdrawal of water, the gas valve is also opened.

The gas valve having been opened, provision is had for maintaining it in that position until the water in tank 3 is again heated to the predetermined temperature whereupon the gas valve automatically closes. This action is had without interfering with the water valve, the latter being automatically restored to closed or starting position as soon as the water outlet is closed. The mechanism for thus locking and releasing the gas valve is here shown embodied in a latch arm 35 which is pivoted at one end to part 9 of the frame and with its free portion extending through the slotted arm 32, a spring 36 interposed between lever 28 and arm 35 maintaining the latter normally extended as far as arm 32 will permit, as in Fig. 2. Carried by arm 35 is latch pin 37 which is held normally projected toward coupling head 19 by spring 37', and when the levers of the thermostatic mechanism are distended as in Fig. 3 this pin is adapted to engage shoulder 19' of head 19 and lock the gas valve in open position after the water valve has returned to normal position, withdrawing stem 13. The gas valve is thus held open until the temperature of the water has raised sufficiently to expand the thermostat and permit the levers and arm 32 to retract under the pull of spring 30 far enough to disengage pin 37 from the coupling head, whereupon the gas valve closes under the pressure of spring 17.

With the above described operation the gas valve is opened only when the temperature of the water is below the predetermined minimum at the time the water valve is operated. Thus, if the conditions are such that the water valve opens without turning on the gas and a considerable amount of heated water is to be withdrawn, it is necessary to momentarily close the water outlet and thereby restore the water valve to normal position so that when it is again operated upon opening the outlet the gas valve will be opened. If it is desired to always open the gas valve when a water outlet is opened, the parts may be constructed as in Fig. 6 wherein the recess 32' of arm 32 is omitted. In this adaptation, even though the temperature of the water may be such as not to cause latch arm 35 to immediately secure the gas valve in open position, the continued withdrawal of water and the resulting distention of levers 27 and 28 following the contraction of tube 25 will result in the latch moving into locking position so that the gas will continue to flow after the water outlet has been closed and until the temperature of the water in tank 3 has been restored.

The improved mechanism is also well adapted for automatically controlling the flow of electric current when this medium is employed for heating the water. To accomplish this, an electric switch is substituted for the gas valve, the operation of the water valve in connection therewith being exactly as above described, either with the construction shown in Figs. 1, 2 and 3 of the water valve operating to turn on the current only after recessed arm 32 has been projected sufficiently to be engaged by stop 32, or with the expedient illustrated in Fig. 6 whereby the current is turned on whenever the water valve is opened.

In the electrical control adaptation, an electric heater 40 of conventional form is projected into tank 3, and the terminals of the electric circuit 41 extended to a switch or controller casing 42 positioned similarly to gas valve casing 15, one terminal of the circuit being pivot screw 43 on which the switch arm 44 turns, and the other terminal being at contact 43' within casing part 42' in the path of the free portion of the switch arm. A stem 45 is substituted for gas valve stem 18, and one side of this stem within casing 42 is formed with the elongated flat or depression 45' which embraces the rounded inner extremity 44' of switch arm 44, said arm being mounted between its ends, as shown, on pivot screw 43. Coöperating with arm extremity 44' is the spring-pressed rounded latch-like detent 46 mounted in casing 42. A spring 47, similar in function to spring 17 of the first described construction, operates to maintain stem 45 normally projected toward the water valve and with the electric switch open.

In operation, when arm 32 is in position to be engaged by stop 34 as in the construction shown in Fig. 5, or if said arm is of the construction shown in Fig. 6, the opening of the gas valve results in outward movement of stem 45, thereby moving switch arm extremity 44' against detent 46 and retracting the latter until the arm extremity passes the center, whereupon the detent operates to snap the switch arm into closed position, shown in dotted lines in Fig. 5. A similar snap action results in opening the switch under the pressure of spring 47 when stem 45 is free to respond thereto, as when latch 35 is retracted from holding position by a rise in the temperature of the water, or when the water valve moves to closed position if the latch is inactive. The throw of arm 44 is limited by stops 48 within part 42' of the casing which incloses the switch.

From the foregoing description it will be seen that the apparatus is quite as well adapted for automatically controlling the flow of electric current to an electric heating device as for controlling the flow of gas to a gas burning heater. The apparatus is of simple construction and certain in operation, and may be accurately adjusted to any predetermined temperature of water within the tank. By means of the pin and slot connection 33 the thermostatic apparatus may have maximum contraction such as will result with very cold water or with very cold atmospheric conditions when the apparatus is not in use, without straining or breaking the parts, at such time if arm 32 is brought into engagement with water valve stem 13 the said pin and slot connection affords the necessary free movement.

I claim:

1. In a water heater, the combination of movable controlling mechanism for a water heating medium, means for normally maintaining said mechanism so that the flow of such medium is shut off, a water pressure operated motor for the controlling mechanism adapted to be actuated upon the release of water, and thermostatic means controlled by the heated water for locking said controlling mechanism in position to permit the heating medium to flow so long as the heated water is below a predetermined temperature while said motor is permitted to return to normal position.

2. In a water heater, the combination of movable controlling mechanism for a water heating medium, means for normally maintaining said mechanism so that the flow of such medium is shut off, a water pressure operated motor adapted to be actuated upon the release of water, thermostatic means controlled by the heated water for operatively connecting the motor with said controlling mechanism, and means actuated by the thermostatic mechanism for locking said controlling mechanism in position to permit the heating medium to flow so long as the water is below a predetermined temperature while permitting said motor to return to normal position.

3. In a water heater, the combination of movable controlling mechanism for a water heating medium, means for normally maintaining said mechanism so that the flow of such medium is shut off, a pressure actuated motor for the controlling mechanism adapted to be operated upon the release of water, a latch device for holding the controlling mechanism in the flow-permitting position to which it is moved by the motor, a thermostat controlled by the heated water for moving the latch device into holding position, and means opposing the movement of the thermostat and operating to release the latch device when the force of the thermostat is relaxed.

4. In a water heater, the combination of movable controlling mechanism for a water heating medium, a water pressure operated motor for the controlling mechanism adapted to be actuated upon the release of water, a thermostat controlled by the heated water, movement-multiplying levers actuated in one direction by the thermostat and a latch device moved by the lever when actuated in said direction for maintaining the said controlling mechanism in position to permit the heating medium to flow, and means for moving the levers and the latch device in a reverse direction for releasing the controlling mechanism, when the force of the thermostat is relaxed.

5. In a water heater, the combination of movable controlling mechanism for a water heating medium, means for maintaining said mechanism so that the flow of such medium is normally shut off, a water pressure operated motor adapted to be actuated upon the release of water, a thermostat controlled by the temperature of the water, a device actuated by the thermostat for operatively connecting the motor and the controlling mechanism, a latch movable with said connecting device for maintaining the controlling mechanism in position to permit the heating medium to flow so long as said connecting device is in operative position, and means operated on the connecting device and the latch and opposing the movement of the thermostat for placing the connecting device and latch in inoperative position when the force of the thermostat is relaxed.

6. In a water heater, the combination of movable controlling mechanism for a water heating medium, means for maintaining said mechanism so that the flow of such medium is normally shut off, an actuating stem projecting from the controlling mechanism, a water pressure operated motor actuated upon the release of water and provided with a stem which projects toward the stem of the controlling mechanism, means for transmitting motion from the motor stem to the stem of the controlling mechanism for moving the latter to flow-permitting position when the motor is actuated, a latch for holding the controlling mechanism in the position to which it is moved by the motor, a thermostat controlled by the temperature of the water for moving the latch into holding position, and spring means for moving the latch in a reverse direction when the force of the thermostat is relaxed.

7. In a water heater, the combination of a controlling device for a water heating medium, a stem projecting therefrom, means for maintaining said mechanism so that the flow of such medium is normally shut off, a water valve, a stem projecting from said valve adapted to be moved toward the first mentioned stem upon the release of water, a thermostat controlled by the temperature of the water, movement-multiplying levers actuated by the thermostat, a device movable with one of said levers for at times operatively connecting said stems, spring means for opposing the movement of the levers, and a latch device movable with the levers and adapted to be placed by the latter in position to engage the controlling mechanism for maintaining the latter in flow-permitting position until the force of the thermostat is relaxed.

8. In a water heater, the combination of movable controlling mechanism for a water heating medium, means for normally maintaining said mechanism so that the flow of such medium is shut off, a water pressure operated motor adapted to be actuated upon the release of water, a thermostat, movement multiplying levers actuated in one direction by the thermostat, spring means opposing the thermostatic movement of the levers, a device movable relative to the motor and to the controlling mechanism for at times operatively connecting said parts, a movable connection between said device and one of said levers, and a latch actuated by said levers for holding the controlling mechanism in flow-permitting position when the water is below a predetermined temperature, the latch being moved to inoperative position by said spring means when the force of the thermostat is relaxed.

9. In a water heater, the combination of movable controlling mechanism for a water heating medium, means for normally maintaining said mechanism so that the flow of such medium is shut off, a coupling device movable with said mechanism, a water valve and a stem projecting from the valve and having sliding connection with the coupling device, thermostatic mechanism controlled by the temperature of the water, a device adapted to be moved by the thermostat into position to connect the water valve stem and the coupling device for transmitting movement from the former to the latter, and means connected to said connecting device and to a stationary element of the heater for opposing the thermostatic movement and adapted to normally maintain the connecting device in inoperative position.

10. In a water heater, the combination of movable controlling mechanism for a water heating medium, means for normally maintaining said mechanism so that the flow of such medium is shut off, a pressure operated motor adapted to be actuated upon the release of water to move the controlling mechanism into flow-permitting position, thermostatic mechanism controlled by the temperature of the water, and means actuated by said mechanism for locking the controlling mechanism in the position to which it is moved by the motor so long as the water is below a predetermined temperature while permitting said motor to return to normal position.

In testimony whereof, I affix my signature in presence of two witnesses.

HERBERT S. HUMPHREY.

Witnesses:
G. J. THOMPSON,
E. S. ELLIOTT.